United States Patent [19]
Pettit, Jr. et al.

[11] Patent Number: 5,055,524
[45] Date of Patent: Oct. 8, 1991

[54] POLYOL-MODIFIED POLYANHYDRIDE CURING AGENT FOR POLYEPOXIDE POWDER COATINGS

[75] Inventors: Paul H. Pettit, Jr., Allison Park; Debra L. Singer, Pittsburgh; William S. Ewing, Gibsonia, all of Pa.

[73] Assignee: PPG Industries, Inc., Pittsburgh, Pa.

[21] Appl. No.: 74,105

[22] Filed: Jul. 16, 1987

[51] Int. Cl.5 .................. C08L 37/00; C08L 63/02
[52] U.S. Cl. .................................. 525/172; 525/176; 525/438; 525/934
[58] Field of Search ................. 525/172, 176, 438

[56] References Cited

U.S. PATENT DOCUMENTS

| | | | |
|---|---|---|---|
| 3,360,543 | 12/1967 | Hoy | 560/89 |
| 3,845,016 | 10/1974 | Labana et al. | 523/434 |
| 3,847,863 | 11/1974 | Labana et al. | 260/42.18 |
| 3,932,367 | 1/1976 | Labana et al. | 260/78.4 D |
| 3,991,133 | 11/1976 | Siwiec et al. | 260/836 |
| 4,024,111 | 5/1977 | Thomas et al. | 525/444 |
| 4,471,025 | 9/1984 | Bernelin et al. | 525/438 |
| 4,499,239 | 2/1985 | Murakami et al. | 525/176 |
| 4,542,192 | 9/1985 | Kraft et al. | 525/438 |

FOREIGN PATENT DOCUMENTS 54-130631  10/1979  Japan .................. 525/172

Primary Examiner—Melvyn I. Marquis
Assistant Examiner—Robert E. L. Sellers, II
Attorney, Agent, or Firm—Daniel J. Long; Godfried R. Akorli

[57] ABSTRACT

There is disclosed herein an improved thermosetting powder coating composition comprising an epoxy resin and a curing agent, the improvement comprising the curing agent which is a polyol-modified polymeric polyanhydride containing anhydride linkages in the polymeric backbone.

15 Claims, No Drawings

POLYOL-MODIFIED POLYANHYDRIDE CURING AGENT FOR POLYEPOXIDE POWDER COATINGS

BACKGROUND OF THE INVENTION

1. Field of the Invention

The present invention relates to thermosetting powder coatings. More specifically, the present invention relates to thermosetting powder coatings based on epoxy resins and anhydride curing agents.

2. Description of the Prior Art

Powder coatings comprising epoxy resins and anhydride curing agents are known in the art. The selection of anhydride curing agents and, for that matter, other curing agents is important in obtaining good processing and performance of powder coatings. Generally, polymeric anhydrides have been preferred over their parent polyacids because the former has been found to be more readily miscible. Also, the polymeric anhydrides have generally been found to be lower melting.

By the present invention, polymeric anhydrides have been modified to produce curing agents for powder coatings with substantially improved properties.

SUMMARY OF THE INVENTION

In accordance with the foregoing, there is provided an improved powder coating which is stable and highly crystalline at room temperature and which can melt sharply with good flow at relatively low temperatures to provide coatings with excellent appearance, durability, and solvent resistance. The sharp melting point is believed to be due to the presence of a modified polyanhydride as described hereinbelow.

In accordance with the foregoing, the present invention encompasses an improved thermosetting powder coating composition comprising an epoxy resin and a curing agent, the improvement comprising the curing agent, which is a polyol-modified polymeric polyanhydride containing anhydride linkages in the polymeric backbone and also containing a plurality of acid functionalities. By saying that the "anhydride linkage is in the backbone" is meant that alcoholysis of the polyanhydride will cause scission of the polymer chain.

In this context, the term thermosetting means that the powder coating composition upon heating will solidify or set to form a coating which will not melt on further heating.

Stability can be determined by placing a sample of the powder coating in a 2 oz. glass jar and immersing in a water bath at 43° C. If there was no evidence of caking or clumping after 48 hours, a good rating was given. If there was no caking or clumping after 168 hours, an excellent rating was given.

Appearance, in terms of 20° and 60° gloss can be measured with gloss meters manufactured by the Gardner Instrument Company.

The impact resistance can be measured with a Gardner Impact Tester. The coated panels were subjected to increasing amounts of impact until the coating cracked. The panel was impacted on the coating side, i.e., direct impact, and also on the side of the coated panel opposite the coating, i.e., reverse impact. The results are reported in inch pounds and the thickness of the coating in mils.

Solvent resistance can be determined by resistance to xylene. A cloth saturated with xylene is rubbed back and forth (double rub) using normal hand pressure over the cured coating. An excellent rating indicates the coating withstood at least 100 double rubs without dulling the coating. A good rating is for 50 double rubs. If less than 50 double rubs mars the coating, a failure is given.

Durability in terms of QUV exposure can be determined by exposing the coated panels to alternating cycles (16 hours) of UV light and condensing humidity (8 hours) in a QUV Accelerated Weathering Tester manufactured by the Q-Panel Co. The UV light is generated with a UVB313 lamp (320-280 nanometers). The temperature of the UV light cycle is 70° C. The temperature of the condensing humidity cycle is 50° C.

DETAILED DESCRIPTION

The powder coating compositions of this invention comprise an intimate mixture of ingredients, principal among which are polyepoxides and polyol-modified polymeric polyanhydride (hereinafter modified polymeric polyanhydride) curing agents. In the present embodiment of the invention, the modified polymeric polyanhydride is prepared by reacting a polymeric polyanhydride with a polyol.

Among the polyepoxides which can be used are epoxy-containing acrylic polymers which are preferred, epoxy condensation polymers such as polyglycidyl ethers of alcohols and phenols and certain polyepoxide monomers and oligomers.

The epoxy-containing acrylic polymer, useful herein, is a copolymer of an ethylenically unsaturated monomer having at least one epoxy group and at least one polymerizable ethylenically unsaturated monomer which is free of epoxy groups.

Examples of ethylenically unsaturated monomers containing epoxy groups are those containing 1,2-epoxy groups and include glycidyl acrylate, glycidyl methacrylate and allyl glycidyl ether.

Examples of ethylenically unsaturated monomers which do not contain epoxy groups are alkyl esters of acrylic and methacrylic acid containing from 1 to 20 atoms in the alkyl group. Specific examples of these acrylates and methacrylates are methyl methacrylate, ethyl methacrylate, butyl methacrylate, ethyl acrylate, butyl acrylate and 2-ethylhexyl acrylate.

Illustrative examples of other copolymerizable ethylenically unsaturated monomers are vinyl aromatic compounds such as styrene and vinyl toluene; nitriles such as acrylonitrile and methacrylonitrile; vinyl and vinylidene halides such as vinyl chloride and vinylidene fluoride and vinyl esters such as vinyl acetate. Generally put, the copolymerizable monomer is such that it does not adversely affect the preparation or use of the powder coating.

The epoxy group-containing ethylenically unsaturated monomer is preferably used in amounts of from about 5 to 60, more preferably from 20 to 50 percent by weight of the total monomers used in preparing the epoxy-containing acrylic polymer. Of the remaining polymerizable ethylenically unsaturated monomers, preferably from 40 to 95 percent, more preferably from 50 to 80 percent by weight of the total monomers are the alkyl esters of acrylic and methacrylic acid.

In preparing the epoxy-containing acrylic polymer, the epoxide functional monomers and the other ethylenically unsaturated monomers can be mixed and reacted by conventional free radical initiated organic solution polymerization as generally described.

The epoxy-containing acrylic polymer typically has a number average molecular weight between about 500 to 100,000, preferably 500 and 20,000, more preferably 1,000 to 10,000, and most preferably 1,000 to 5,000. The molecular weight is determined by gel permeation chromatography using a polystyrene standard. In determining molecular weights in this fashion, it is not the actual molecular weights which are measured but an indication of the molecular weight as compared to polystyrene. The values which are obtained are commonly referred to as polystyrene numbers. However, for the purposes of this invention, they are referred to as molecular weights.

The epoxy condensation polymers which are used are polyepoxides, that is, those having a 1,2-epoxy equivalency greater than 1, preferably greater than 1 and up to about 3.0. Examples of such epoxides are polyglycidyl ethers of polyhydric phenols and of aliphatic alcohols. These polyepoxides can be produced by etherification of the polyhydric phenol or aliphatic alcohol with an epihalohydrin such as epichlorohydrin in the presence of alkali.

Examples of suitable polyphenols are 2,2-bis(4-hydroxyphenyl)propane (bisphenol A), 1,1-bis(4-hydroxyphenyl)ethane and 2-methyl1,1-bis(4-hydroxyphenyl)propane. Examples of suitable aliphatic alcohols are ethylene glycol, diethylene glycol, 1,2-propylene glycol and 1,4-butylene glycol. Also, cycloaliphatic polyols such as 1,2-cyclohexanediol, 1,4-cyclohexanediol, 1,2-bis(hydroxymethyl)cyclohexane and hydrogenated bisphenol A can also be used.

Besides the epoxy-containing polymers described above, certain polyepoxide monomers and oligomers can also be used. Examples of these materials are described in U.S. Pat. No. 4,102,942 in column 3, lines 1-16. Specific examples of such low molecular weight polyepoxides useful herein are 3,4-epoxycyclohexylmethyl 3,4-epoxycyclohexanecarboxylate and bis(3,4-epoxycyclohexylmethyl) adipate. These materials are aliphatic polyepoxides as are the epoxy-containing acrylic polymers. As mentioned above, the epoxy-containing acrylic polymers are preferred because they result in products which have the best combination of coating properties, i.e., smoothness, gloss, durability and solvent resistance. Also, they have been found to be particularly good in the formulation of clear coats for color-plus-clear applications.

In a preferred embodiment of the invention, the polyepoxide is the epoxy-containing acrylic polymer mentioned above. This epoxy-containing acrylic polymer provides for the best blend of gloss and cure response in the resultant cured coating and coating composition.

The polyepoxide is typically present in the crosslinkable composition in amounts of about 25 to 90, preferably from 50 to 80 percent by weight based on total weight of resin solids. When a lower molecular weight polyepoxide is used, it is typically used in amounts of 1 to 40, preferably 5 to 30 percent by weight based on total weight of resin solids.

As afore-stated, in the present embodiment of the invention, the modified polymeric polyanhydride can be prepared by reacting a polymeric polyanhydride with a polyol. The starting polymeric polyanhydride is characterized in that it contains anhydride linkages in the polymer backbone. Useful herein are polyanhydrides of polycarboxylic acids, such as dicarboxylic acids, containing from 3 to 20 and preferably from 6 to 12 carbon atoms. Illustrative examples thereof are poly(adipic anhydride), poly(azelaic anhydride), poly(sebacic anhydride), poly(dodecanedioic anhydride), and the like, or a mixture thereof. In the present embodiment of the invention poly(dodecanedioic) anhydride is preferred. Higher functional acids, such as citric acid, tartaric acid, and the like, can be used preferably in combination with the diacids.

The starting polyols can contain two and preferably more than two hydroxyl groups. Illustrative examples of the polyols that are typically used herein are trimethylolpropane, pentaerythritol, sorbitol, and the like; resinous polyols, such as polyester polyols, polyether polyols, polyurethane polyols, cellulose acetate butyrate, polycaprolactone polyol and the like. In the present embodiment of the invention, trimethylolpropane is preferred. Besides polyols, other anhydride reactive materials, such as hydroxy acids, hydroxy amine, amines, mercapto compounds and precursors thereof, may be employed.

In the process of preparing the modified polymeric polyanhydride, excess polymeric polyanhydride is reacted with the polyol, in a ratio of from about 0.1 to 0.9:1 and preferably 0.3 to 0.6:1 equivalent of hydroxyl group to anhydride group; with the anhydride being considered monofunctional.

The reaction of the polymeric polyanhydride and the polyol can be conducted over a temperature range of about 100 to 140 and typically about 120° C. to 130° C. The reaction time can be from 30 minutes to 3 hours and typically 2 to 2½ hours.

The resultant modified polymeric polyanhydride has per molecule a plurality of carboxyl groups, anhydride linkages in the polymer backbone and ester groups. By "plurality of carboxyl groups" is meant at least two carboxyl groups per molecule. In a presently preferred embodiment of the invention, the resultant modified polymeric polyanhydride is branched. Branching occurs when higher functional polyols, such as trimethylolpropane, is reacted with a polymeric polyanhydride.

The resultant modified polymeric polyanhydride contains from about 5 to 0.04:1 and preferably 3 to 1:1 equivalent of anhydride groups to carboxyl groups.

The equivalent ratio of total and acid groups to epoxide groups is preferably within the range of about 1.5 to 0.5:1, preferably 1.2 to 0.7:1. The acid equivalent can be determined by alcoholic KOH titration, wherein the alcoholic-KOH titrates each anhydride as a monofunctional acid group.

The claimed invention encompasses powder coating compositions containing the polyol-modified polyanhydride as described hereinabove. Also, the present invention encompasses powder coatings containing polyanhydrides of the structure of polyol-modified polymeric polyanhydrides described herein which are prepared by alternate means.

The powder coating compositions, in accordance with the present invention, may include a small percentage of catalyst in order to increase the crosslinking rate of the powder coating composition upon baking. Baking temperatures will ordinarily be within the range of about 250° to 350° F. (121° to 177° C.). Suitable catalysts are quaternary ammonium salts, quaternary phosphonium salts, phosphines, imidazoles and metal salts. Examples include tetrabutylammonium chloride, bromide or iodide, ethyltriphenylphosphonium acetate, stannous octoate, triphenylphosphine, 2-methylimidazole and dibutyltin dilaurate. The catalyst is preferably present in the composition in amounts up to 5, preferably about 0.5 to 3 percent by weight based on weight of resin solids.

In order to give the powder coating composition a suitable color, a pigment can be included in the coating composition typically in amounts of from about 1 to 50 percent by weight based on total weight of the powder coating composition. Pigments which are suitable for powder coating compositions include basic titanium dioxide, ultramarine blue, phthalocyanine blue, phthalocyanine green, carbon black, black iron oxide, chromium green oxide, ferrite yellow and quindo red.

The powder coating composition may also contain certain other additives that are typically incorporated into powder coating compositions. Particularly recommended are UV stabilizers, anti-popping agents which allow volatiles to escape from the film during baking and flow control agents which prevent cratering of the finish. Benzoin is a highly preferred anti-popping agent and, when used, is present in an amount ranging from about 0.5 percent by weight to 3 percent by weight based on total weight of the coating composition.

One group of suitable flow control agents are acrylic polymers such as polylauryl acrylate, polybutyl acrylate, poly(2-ethylhexyl) acrylate, polylauryl methacrylate and polyisodecyl methacrylate. The flow control agent may also be fluorinated polymers such as esters of polyethylene glycol or polypropylene glycol and fluorinated fatty acids. For example, as ester of polyethylene glycol of molecular weight of over 2,500 and perfluorooctanoic acid. Polymeric siloxanes of molecular weights over 1,000 may also be used as a flow control agent, for example, poly(dimethylsiloxane) or poly(methylphenyl)siloxane.

The flow control agent, when used, is present in amounts of 0.05 to 5 percent by weight based on total weight of the coating composition.

The powder coating composition of this invention can be prepared by blending the ingredients of the coating composition in a high shear mixer such as a high intensity WELEX mixer and then melt blending the resultant mixture in an extruder at a temperature of about 80 to 130° C. The extrudate is then cooled and ground so as to pass through a 140-200 mesh sieve. The powder coating composition can then be applied directly to metal, glass, plastics, and other substrates.

It has been found that the powder coatings of this invention are generally stable at room temperature and melt (low melt viscosity) at relatively low temperature with good flow to provide cured coatings with excellent appearance, durability, and solvent resistance. As such, the powder coatings of this invention are particularly suitable for use as a clear coat in a color-plus-clear multi-layered coating applications.

The powder coating composition can be applied to a substrate by any of the conventional powder coating techniques such as electrostatic spraying, fluidized bed, tribo spraying, or non-electrostatic application to pretreated substrates, but it is preferred that electrostatic spraying be used since this gives the best appearance.

After application, the coated substrate is heated to cure the coating. The heating or curing operation is usually carried out at a temperature in the range from 250° to 350° F., but, if needed, lower or higher temperatures may be used depending upon whether it is sufficient to activate any necessary crosslinking mechanisms.

In accordance with this invention, polyol-modification of the polyanhydride can produce improved powder coating properties in areas such as miscibility, appearance, flexibility, solvent resistance, crosslink density or a combination of these and other desirable properties, depending on the nature of the polyol and the polyanhydride and of course other ingredients of the powder coating. With the present teaching of the invention the selection of these various materials will be within the purview of the skilled artisan.

This and other aspects of the invention are further illustrated by the following non-limiting examples.

EXAMPLES

The examples show the preparation of a polyepoxide and the modified polyanhydride which is useful in the practice of the present invention.

EXAMPLE A

| Ingredients | Parts by Weight (grams) | Percentage by Weight |
|---|---|---|
| Xylene | 306.7 | |
| Glycidyl methacrylate | 176.4 | 40.0 |
| Methyl methacrylate | 176.4 | 40.0 |
| Butyl acrylate | 44.1 | 10.0 |
| Styrene | 44.1 | 10.0 |
| VAZO-67[1] | 25.6 | 5.0 |

[1]Alpha, alpha'-dimethylazobis(isobutyronitrile) available from E. I. DuPont de Nemours and Company.

Xylene was charged to a suitable reactor and heated to reflux to remove water through a Dean-Stark trap. The glycidyl methacrylate, methyl methacrylate, butyl acrylate, and styrene were mixed together and added simultaneously with the VAZO-67 to the reaction vessel over a period of about three hours while maintaining the reaction temperature at reflux. At the completion of the addition, the reaction mixture was held at reflux for two hours followed by the application of vacuum to remove solvent. The resultant reaction product had a solids content of 99.5 percent (measured at 150° C. for two hours).

EXAMPLE B

The following example shows the preparation of the modified polyanhydride of this invention.

| Ingredients | Parts by Weight (grams) | Equivalents |
|---|---|---|
| | Charge I | |
| Dodecanedioic acid | 2070.0 | 18.0 |
| Acetic anhydride | 612.0 | 6.0 (of anhydride) |
| | Charge II | |
| Trimethylolpropane | 196.2 | 4.39 |

In a properly equipped reaction vessel, Charge I was heated under a nitrogen blanket to 125° C. and held thereat for two hours. The resultant mixture was placed under vacuum at 125° C. and distilled until there is no more distillate being collected. Charge II was then added at 122° C with a resulting exotherm to 130° C. The reaction product was held at 130° C. for one hour and then discharged.

EXAMPLE B-1

The following example shows the preparation of the modified polyanhydride of this invention.

| Ingredients | Parts by Weight (grams) | Equivalents |
|---|---|---|
| Charge I | | |
| Dodecanedioic acid | 2070.0 | 18.0 |
| Acetic anhydride | 612.0 | 6.0 (of anhydride) |
| Charge II | | |
| Trimethylolpropane | 98.1 | 2.19 |

In a properly equipped reaction vessel, Charge I was heated under a nitrogen blanket to 125° C. and held thereat for two hours. The resultant mixture was placed under vacuum at 125° C. and distilled until there was no more distillate being collected. Charge II was then added at 125° C. with a resulting exotherm to 130° C. The reaction product was held at 130° C. for one hour and then discharged and analyzed: Solids content was 100 percent, molecular weight was 2,258.

EXAMPLE B-2

The following example shows the preparation of the polymeric polyanhydride and the modified polyanhydride of this invention. The polymeric polyanhydride was prepared as follows:

| Ingredients | Parts by Weight (grams) | Equivalents |
|---|---|---|
| Charge I | | |
| DBD 101[1] acid | 2070.0 | 18.0 |
| Acetic anhydride | 803.8 | 7.8 (of anhydride) |

[1] Available from E. I. DuPont de Nemours & Co., analyzed as 96% docecanedioic acid.

In a properly equipped reaction vessel, Charge I was heated under a nitrogen blanket to 125° C. and held thereat for two hours. The resultant mixture was placed under vacuum at 125° C. and distilled until there was no more distillate being collected.

The modified polyanhydride was prepared as follows:

| Ingredients | Parts by Weight (grams) |
|---|---|
| Charge I | |
| The polymeric polyanhydride from above | 487.4 |
| Charge II | |
| Sorbitol | 30.3 |

Charge II was added to Charge I at 125° C. with a resulting exotherm to 144° C. The reaction product was held at 125° C. for about 1½ hours and then discharged and analyzed Solids content was 99.7 percent, acid value was 408.2 and molecular weight was 3,853.

EXAMPLE B-3

The following example shows the preparation of the modified polyanhydride of this invention.

| Ingredients | Parts by Weight (grams) | Equivalents |
|---|---|---|
| Charge I | | |
| Dodecanedioic acid | 92.0 | 8.0 |
| Acetic anhydride | 1020.0 | 10.0 |
| Charge II | | |
| Trimethylolpropane | 40.8 | 2.19 |
| Triphenyl phosphite | 0.8 | |

In a properly equipped reaction vessel, Charge I was heated under a nitrogen blanket to 125° C. and held thereat for two hours. The resultant mixture was placed under vacuum at 125° C. and distilled to 100 percent solids. Charge II was then added at 125° C. and held thereat for 1½ hours. The reaction product was placed under vacuum to remove residual acetic acid.

EXAMPLE B-4

The following example shows the preparation of the modified polyanhydride of this invention.

| Ingredients | Parts by Weight (grams) | Equivalents |
|---|---|---|
| Charge I | | |
| Dodecanedioic acid | 1380.0 | 12.0 |
| Acetic anhydride | 535.5 | 5.25 |
| Charge II | | |
| Cellulose acetate butyrate | 320.0 | |

In a properly equipped reaction vessel, Charge I was heated under a nitrogen blanket to 125° C. and held thereat for two hours. Charge II was then added to 720 grams of the resultant product. The reaction mixture was held for two hours at 125° C. and then vacuum stripped to 100 percent solids.

EXAMPLE B-5

The following example shows the preparation of the modified polyanhydride of this invention.

| Ingredients | Parts by Weight (grams) | Equivalents |
|---|---|---|
| Charge I | | |
| Polyanhydride of Dodecanedioic acid as described in the first part of Example B-2 | 582.0 | 2.38 |
| Trimethylolpropane | 30.6 | .685 |

The polyanhydride was introduced into and heated under a nitrogen blanket to 125° C. The trimethylolpropane was added thereto at 125° C. with a resulting exotherm to 141° C. The resulting mixture was held for about two hours at 125° C. and then placed under vacuum to remove any residual acetic acid. The reaction product was then discharged.

EXAMPLE 1

This example shows the preparation of a powder coating of this invention.

| Ingredients | Parts by Weight (grams) |
|---|---|
| Epoxy-containing acrylic of Example A | 555 |
| Trimethylolpropane - modified polyanhydride of Example B | 165 |
| 12-Hydroxystearic acid | 40 |
| Benzoin | 6.1 |

| Ingredients | Parts by Weight (grams) |
|---|---|
| MODAFLOW III[1] | 9.3 |
| Tinuvin 900[2] | 15.2 |
| Tinuvin 144[3] | 7.6 |

[1]Flow control agent available from Monsanto Co.
[2]UV Stabilizer available from Ciba-Geigy Corp.
[3]Hindered amine light-stabilizer available from Ciba-Geigy Corp.

The ingredients were first blended in a WELEX mixer for about two minutes, then melt blended in a Baker Perkins Twin Screw Extruder at 110° C., chilled on a chill roll at 20° C., flaked and then ground in a micromill and sieved through a 200-mesh screen.

The resulting powder composition was then electrostatically sprayed on primed and basecoated steel panels using an electrostatic powder spray gun. After deposition, the panels were heated to 177° C. for 20 minutes. The hard and glossy coating on the panels had thickness ranging from 2 to 3 mils, good adhesion to the steel panel, and good impact strength. The coating also had excellent appearance and solvent resistance and good durability as measured by accelerated UV testing.

EXAMPLE 2

This example shows the preparation of a powder coating of this invention.

| Ingredients | Parts by Weight (grams) |
|---|---|
| Epoxy-containing acrylic of Example A | 555 |
| Trimethylolpropane - modified polyanhydride of Example B-1 | 165 |
| 12-Hydroxystearic acid | 40 |
| Benzoin | 6.1 |
| MODAFLOW III[1] | 9.3 |
| Tinuvin 900[2] | 15.2 |
| Tinuvin 144[3] | 7.6 |

[1]Flow control agent, available from Monsanto Co.
[2]UV Stabilizer, available from Ciba-Geigy Corp.
[3]Hindered amine light-stabilizer, available from Ciba-Geigy Corp.

The ingredients were first blended in a WELEX mixer for about two minutes, then melt blended in a Baker Perkins Twin Screw Extruder at 110° C., chilled on a chill roll at 20° C., flaked and then ground in a micromill and sieved through a 200-mesh screen.

The resulting powder composition was then electrostatically sprayed on primed and basecoated steel panels using an electrostatic powder spray gun. After deposition, the panels were heated to 177° C. for minutes. The hard and glossy coating on the panels had a thickness ranging from 2 to 3 mils, good adhesion to the steel panel, and good impact strength. The coating also had excellent appearance, durability, as measured by accelerated UV testing and solvent resistance.

EXAMPLE 3

This example shows the preparation of a powder coating of this invention.

| Ingredients | Parts by Weight (grams) |
|---|---|
| Epoxy-containing acrylic of Example A | 555 |
| Sorbitol - modified polyanhydride of Example B-2 | 165 |
| 12-Hydroxystearic acid | 40 |
| Benzoin | 6.1 |
| MODAFLOW III[1] | 9.3 |
| Tinuvin 900[2] | 15.2 |
| Tinuvin 144[3] | 7.6 |

[1]Flow control agent, available from Monsanto Co.
[2]UV Stabilizer, available from Ciba-Geigy Corp.
[3]Hindered amine light-stabilizer, available from Ciba-Geigy Corp.

The ingredients were first blended in a WELEX mixer for about two minutes, then melt blended in a Baker Perkins Twin Screw Extruder at 110° C., chilled on a chill roll at 20° C., flaked and then ground in a micromill and sieved through a 200-mesh screen.

The resulting powder composition was then electrostatically sprayed on primed and basecoated steel panels using an electrostatic powder spray gun. After deposition, the panels were heated to 177° C. for minutes. The hard and glossy coating on the panels had a thickness ranging from 2 to 3 mils, good adhesion-to the steel panel and good impact strength. The coating also had excellent appearance, durability (by accelerated UV testing), and solvent resistance.

EXAMPLE 4

This example shows the preparation of a powder coating of this invention.

| Ingredients | Parts by Weight (grams) |
|---|---|
| Epoxy-containing acrylic of Example A | 555 |
| Pentaerythritol[1]- modified polyanhydride | 165 |
| 12-Hydroxystearic acid | 40 |
| Benzoin | 6.1 |
| MODAFLOW III[2] | 9.3 |
| Tinuvin 900[3] | 15.2 |
| Tinuvin 144[4] | 7.6 |

[1]This polyol-modified polymeric polyanhydride was prepared in essentially the same manner as described in Example B except that the polyol was pentaerythritol.
[2]Flow control agent, available from Monsanto Co.
[3]UV Stabilizer, available from Ciba-Geigy Corp.
[4]Hindered amine light-stabilizer, available from Ciba-Geigy Corp.

The ingredients were first blended in a WELEX mixer for about two minutes, then melt blended in a Baker Perkins Twin Screw Extruder at 130° C., chilled on a chill roll at 20° C., flaked (there was slight sticking to the rolls), and then ground in a micromill and sieved through a 200-mesh screen.

The resulting powder coating composition was then electrostatically sprayed on primed and basecoated steel panels using an electrostatic powder spray gun. After deposition, the panels were heated to 325° F. (163° C.) for 30 minutes. The hard and glossy coating on the panels had a thickness ranging from 2 to 4 mils, and good adhesion to the basecoat. The coating also had excellent appearance.

EXAMPLE 5

This example shows the preparation of a powder coating of this invention.

| Ingredients | Parts by Weight (grams) |
| --- | --- |
| Epoxy-containing acrylic of Example A | 690.30 |
| CAB-modified polyanhydride[1] | 205.22 |
| Benzoin | 7.84 |
| MODAFLOW II[2] | 12.06 |
| Tinuvin 900[3] | 19.90 |
| Tinuvin 144[4] | 7.6 |
| AEROSIL 200[5] | 4.98 |

[1]This polyol-modified polymeric polyanhydride which was prepared in essentially the same manner as described in Example B except that the polyol was cellulose acetate butyrate (CAB 551-01 available from Eastman Chemicals) at 10 percent of final solids of the modified polyanhydride.
[2]Flow control agent, available from Monsanto Co.
[3]UV Stabilizer, available from Ciba-Geigy Corp.
[4]Hindered amine light-stabilizer, available from Ciba-Geigy Corp.
[5]Low particle size silica, available from Degussa, Inc.

The ingredients were first blended in a WELEX mixer for about two minutes, then melt blended in a Baker Perkins Twin Screw Extruder at 130° C., chilled on a chill roll at 20° C., (there was some slight sticking) flaked and then ground in a micromill and sieved through a 200-mesh screen.

The resulting powder coating composition was then electrostatically sprayed on primed and basecoated steel panels using an electrostatic powder spray gun. After deposition, the panels were heated to 325° F. (163° C.) for 30 minutes. The hard and glossy coating on the panels had a thickness ranging from 2 to 4 mils and good adhesion to the basecoat. The coating also had excellent appearance.

EXAMPLE 6

This example shows the preparation of the powder coating of this invention.

| Ingredients | Parts by Weight (grams) |
| --- | --- |
| Epoxy-containing acrylic of Example A | 555 |
| PCP-0301-modified polyanhydride[1] | 165 |
| 12-Hydroxystearic acid | 40 |
| Benzoin | 6.1 |
| MODAFLOW III[2] | 9.3 |
| Tinuvin 900[3] | 15.2 |
| Tinuvin 144[4] | 7.6 |

[1]This polyol-modified polymeric polyanhydride was prepared in essentially the same manner as described in Example B except that the polyol was polycaprolactone polyol (PCP-0301, available from Union Carbide Co.) at 15 percent of the final solids of the modified polyanhydride.
[2]Flow control agent, available from Monsanto Co.
[3]UV Stabilizer, available from Ciba-Geigy Corp.
[4]Hindered amine light-stabilizer, available from Ciba-Geigy Corp.

The ingredients were first blended in a WELEX mixer for about two minutes, then melt blended on a Baker Perkins Twin Screw Extruder at 130° C., chilled on a chill roll at 20° C., flaked and then ground in a micromill and sieved through a 200-mesh screen.

The resulting powder coating composition was then electrostatically sprayed on primed and basecoated steel panels using an electrostatic powder spray gun. After deposition, the panels were heated to 325° F. (163° C.) for 30 minutes. The hard and glossy coating on the panels had a thickness ranging from 2 to 4 mils and good adhesion to the basecoat. The coating also had excellent appearance.

EXAMPLE 7

This example shows the preparation of the powder coating of this invention.

| Ingredients | Parts by Weight (grams) |
| --- | --- |
| Epoxy-containing acrylic polymer of Example A | 690.40 |
| 12-Hydroxystearic acid | 49.75 |
| Trimethylolpropane - modified polyanhydride of Example B-5 | 205.25 |
| AEROSIL 200 | 4.98 |
| MODAFLOW III[1] | 12.00 |
| Benzoin | 7.84 |
| Tinuvin 900[2] | 19.90 |
| Tinuvin 144[3] | 9.98 |

[1]Flow control agent, available from Monsanto Co.
[2]UV Stabilizer, available from Ciba-Geigy Corp.
[3]Hindered amine light-stabilizer, available from Ciba-Geigy Corp.

The epoxy-containing acrylic polymer of Example A and modified polyanhydride were pre-milled in a hammermill at 2,000 revolutions per minute for 30 seconds. The pre-milled ingredient and the other ingredients listed above were then blended in a WELEX mixer for about two minutes, then melt blended in a Baker Perkins Twin Screw Extruder at 130° C., chilled on a chill roll at 20° C., flaked and then ground in a micromill and sieved through a 200-mesh screen.

The resulting powder composition was then electrostatically sprayed on primed and basecoated steel panels using an electrostatic powder spray gun. After deposition, the panels were heated to 325° F. for 30 minutes. The hard and glossy coating on the panels had a thickness ranging from 2 to 3 mils, good adhesion, and good impact strength. The coating also had excellent appearance and solvent resistance.

What is claimed is:

1. In an improved thermosetting powder coating composition comprising an epoxy resin and a curing agent, the improvement comprising the curing agent which is a polyol-modified polymeric polyanhydride containing anhydride linkages in the polymeric backbone, and also containing a plurality of acid functionalities; said powder coatings are prepared by melt blending at a temperature of about 80° C. to 130° C. followed by cooling and grinding to a powder form.

2. The powder coating composition of claim 1, wherein the epoxy resin comprises an epoxy-containing acrylic polymer.

3. The powder coating composition of claim 2, wherein the epoxy-containing acrylic polymer is a copolymer of ethylenically unsaturated monomers having at least one epoxy group and another ethylenically unsaturated monomer which is free of an epoxy group.

4. The powder coating composition of claim 3 in which the epoxy-functional copolymer has a number average molecular weight of between 500 and 20,000.

5. The powder coating composition of claim 4 in which the copolymer is a copolymer of glycidyl acrylate or methacrylate with at least one other copolymerizable ethylenically unsaturated monomer.

6. The powder coating composition of claim 5 in which the other copolymerizable ethylenically unsaturated monomer comprises at least in part an alkyl ester of acrylic or methacrylic acid containing from 1 to 20 carbon atoms in the alkyl group.

7. The powder coating composition of claim 5 in which the glycidyl acrylate or methacrylate comprises from 5 to 60 percent of the monomers used in preparing the epoxy-containing acrylic polymer.

8. The powder coating composition of claim 3 in which the epoxy group-containing acrylic polymer is present in amounts of 10 to 90 percent by weight based on total weight of resin solids.

9. The powder coating composition of claim 1 wherein the polyol-modified polymeric polyanhydride is prepared by reacting a polymeric polyanhydride with a polyol.

10. The powder coating composition of claim 9 wherein the polymeric polyanhydride is poly(adipic anhydride), poly(azelaic anhydride), poly(sebacic anhydride), poly(dodecanedioic anhydride) or a mixture thereof.

11. The powder coating composition of claim 10 wherein the polymeric polyanhydride is poly(dodecanedioic anhydride).

12. The powder coating composition of claim 9 wherein the polyol is selected from the group consisting of trimethylolpropane, sorbitol, pentaerythritol, polycaprolactone polyol, and cellulose acetate butyrate.

13. The powder coating composition of claim 12 wherein the polyol is trimethylolpropane.

14. The powder coating composition of claim 9 wherein the polyol-modified polymeric polyanhydride is present in amounts of 5 to 50 percent by weight based on total weight of resin solids.

15. Article of matter comprising a substrate to which is applied the powder coating of claim 1.

* * * * *

UNITED STATES PATENT AND TRADEMARK OFFICE
CERTIFICATE OF CORRECTION

PATENT NO. : 5,055,524

DATED : October 8, 1991

INVENTOR(S) : Paul H. Pettit, Jr. et al

It is certified that error appears in the above-identified patent and that said Letters Patent is hereby corrected as shown below:

Col. 12, line 58, "epoxy-functional" should be --epoxy-containing acrylic--

Signed and Sealed this

Twenty-seventh Day of April, 1993

*Attest:*

MICHAEL K. KIRK

*Attesting Officer*  Acting Commissioner of Patents and Trademarks